Dec. 13, 1938.  C. L. HANEL  2,140,010
ONION CHOPPER
Filed March 10, 1938  2 Sheets-Sheet 1
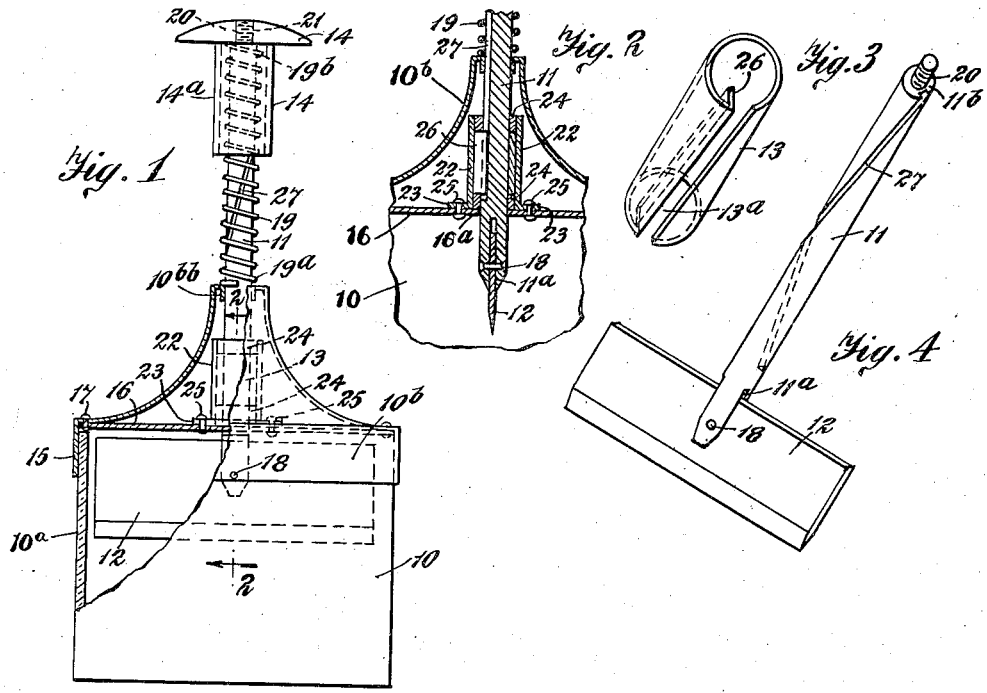
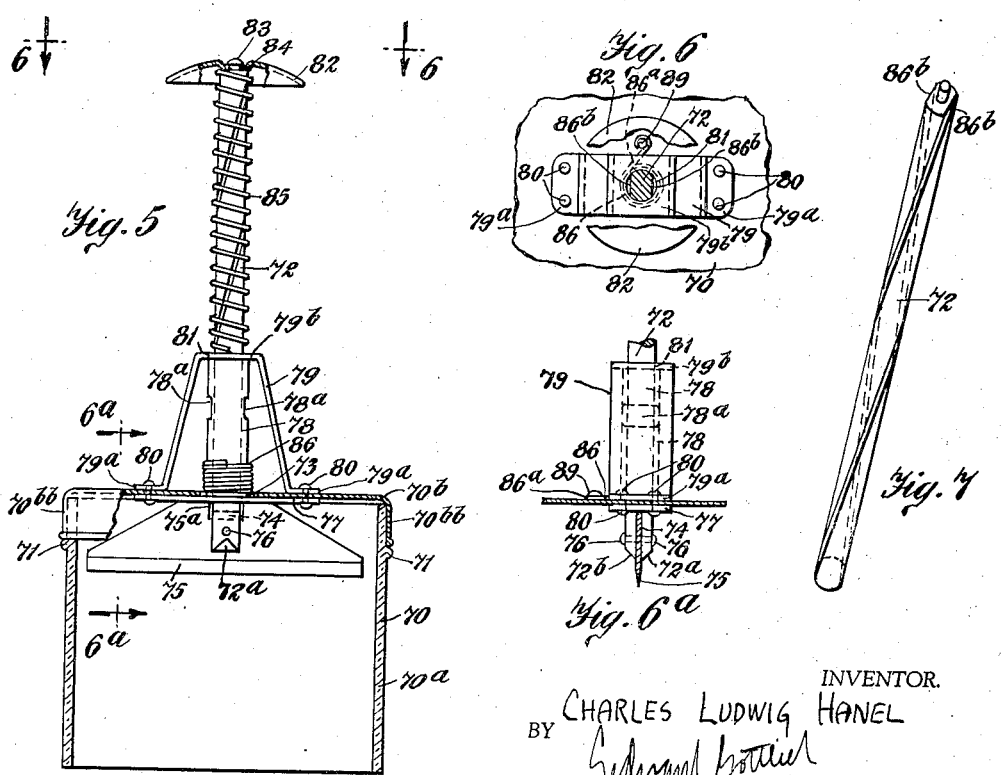
INVENTOR.
CHARLES LUDWIG HANEL
BY
ATTORNEY.

Dec. 13, 1938. C. L. HANEL 2,140,010
ONION CHOPPER
Filed March 10, 1938 2 Sheets-Sheet 2
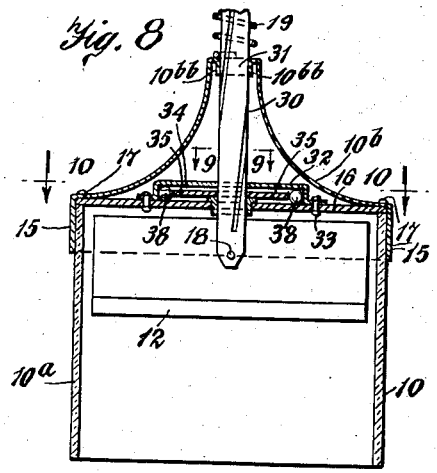
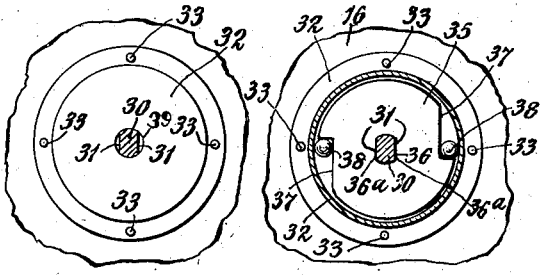
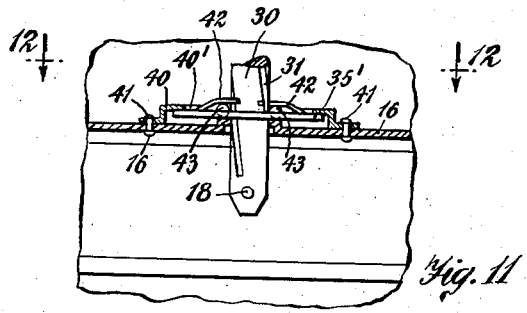
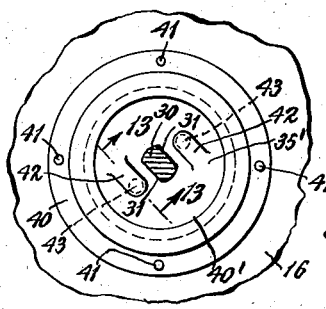
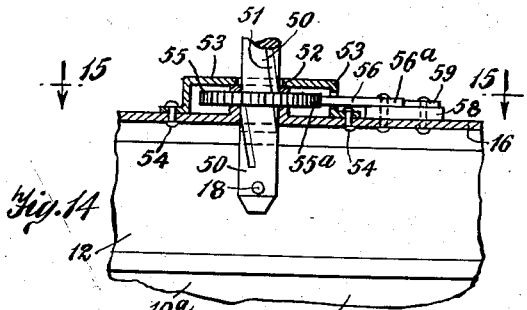
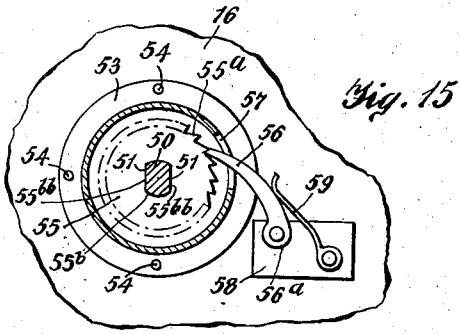
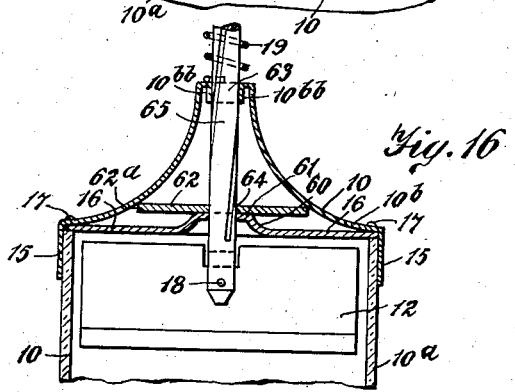
INVENTOR.
BY CHARLES LUDWIG HANEL
ATTORNEY.

Patented Dec. 13, 1938

2,140,010

UNITED STATES PATENT OFFICE 2,140,010

ONION CHOPPER

Charles Ludwig Hanel, Jackson Heights, N. Y.

Application March 10, 1938, Serial No. 195,112

12 Claims. (Cl. 30—315)

This invention relates to new and useful improvements in an onion chopper.

More specifically, the invention relates to a chopper which may be used for chopping onions and which is capable of chopping many other foods or materials.

Still further it is proposed to characterize the onion chopper by a body for engaging over an onion or other material, and to provide a stem vertically slidably mounted therethrough, and to mount upon its inner end of the stem a chopper blade for chopping the onion or other material when the stem is moved downwards.

The dominating object of this invention is to provide a means for slightly rotating said stem when the stem moves upwards, but said means to be capable of permitting the stem to move downwards without any rotation when pressed manually in that direction.

Still further it is proposed to characterize the said means by an element which encircles said stem intermediate of its ends and which is turnably supported within a portion of the body and which is adapted to resist turning in one direction, namely, when the stem is moved upwards, and to indirectly control turning of the stem during its upward motion.

Another object of this invention is to form cooperative helix elements upon said element and said stem for causing the element to turn when the stem moves in the other direction, that is, when it moves downwards so that the stem does not then turn.

Another object of this invention is to form the extended end of the stem with a friction head which is adapted to engage one's hand when the stem is depressed for holding the stem from turning and so cause the element to turn so that the chopper blade will move straight downwards within said body.

Another object of the invention is the construction of a device as described which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a front elevational view, partly in section, of an onion chopper constructed according to this invention.

Fig. 2 is a sectional view taken on the line 2—2 of Fig. 1.

Fig. 3 is a perspective view of the element per se.

Fig. 4 is a perspective view of the stem per se.

Fig. 5 is a view similar to Fig. 1 but illustrating a modification of the invention.

Fig. 6 is a fragmentary view looking in the direction of the line 6—6 of Fig. 5.

Fig. 6a is a view taken on the line 6a—6a of Fig. 5.

Fig. 7 is a perspective view of the stem used in conjunction with the modification shown in Fig. 5.

Fig. 8 is a view similar to Fig. 1 but illustrating a still further modification of the invention.

Fig. 9 is a sectional view on the line 9—9 of Fig. 8.

Fig. 10 is a sectional view on the line 10—10 of Fig. 8.

Fig. 11 is a sectional view illustrating another modification of the invention.

Fig. 12 is a view looking in the direction of the line 12—12 of Fig. 11.

Fig. 13 is an enlarged sectional view on the line 13—13 of Fig. 12.

Fig. 14 is a view similar to Fig. 11 but illustrating another modification of the invention.

Fig. 15 is a sectional view on the line 15—15 of Fig. 14.

Fig. 16 is a view similar to Fig. 8 but illustrating another modification of the invention.

The onion chopper includes a body 10 for engaging over an onion or other material to be chopped. A stem 11 is slidably mounted through the body 10. A chopper blade 12 is mounted on the bottom end of the stem 11 for cutting the onion when the stem is moved downwards. Means is provided for urging the stem into a raised position. An element 13 encircles the stem 11 and is turnably supported in the body 10 and is adapted to resist turning in one direction, under certain conditions, as will hereinafter be explained. Cooperative helix element are formed on the element 13 and the stem 11 and cause the element 13 to turn in the other direction when the stem is moved downwards, as hereinafter more fully described. A friction head 14 is mounted on the stem 11 and engages one's hand when the stem 11 is manually depressed with the palm to hold the stem 11 from turning, and so cause the element 13 to turn, as will become clear.

The body 10 includes a tubular glass member or similar article 10a which has both of its ends open and which has one of its ends closed by a cap element 10b. The cap element 10b is substantially frusto-conical in shape and is formed at its enlarged end with a downwardly extending flange 15 which encircles one of the ends of the tubular member 10a for closing this end. A plate 16 is mounted across the enlarged end of the conical shaped cap element 10b and is fixedly secured thereto by rivets 17 and is adapted to rest on the edges of the glass member 10a. The upper end of the conical cap 10b is open and has its edges 10bb bent inwards. The plate 16 is formed with an opening 16a which is directly below the open top end of the conical cap 10b.

The stem 11 engages through the open end of the conical cap 10b and the opening 16a and is formed at its bottom end with an inwardly extending slot 11a. The chopper blade 12 has its rear edge inserted into the slot 11a and is pivotally supported thereon by means of a rivet 18 engaging through these parts. This rivet pivotally supports the chopper blade in such a manner that it will be capable of properly aligning itself with the surface against which it engages when the stem 11 is depressed.

The means for urging the stem 11 into its raised position comprises an expansion spring 19 which has one of its ends 19a engaging against the upper end of the conical shaped cap 10b and the other of its ends 19b bearing against the friction head 14 for urging the stem 11 upwards. The upper end 11b of the stem 11 is formed with a reduced shoulder and threaded portion 20 for an opening 21 formed in the friction head 14 for supporting this head upon the end of the shaft 11. The friction head 14 is formed with a downwardly extending tubular member 14a which is adapted to encircle the top coils of the spring 19.

A sleeve 22 has an outwardly extending flange 23 by which it is securely attached to the top face of the plate 16 over the opening 16a, and the stem 11 passes through this sleeve 22. The element 13 is rotatively supported within the sleeve 22 and is held in axial position therein by means of collars 24 which are forced into the open ends of the sleeve 22. Rivets 25 engage through the adjacent portions of the flange 23 and the plate 16 for holding the sleeve in fixed positions.

One side of the element 13 is resilient and formed with a slit 13a and the material of the element 13 at one side of the slit is bent inwards to form a helical lip 26. This helical lip engages a complementary helical groove 27 formed along the length of the stem 11. The helical lip 26 is formed in such a manner that when the stem 11 is urged downwards the element 13 is wound to tend to contract and the friction between the friction head 14 and one's hand will prevent the stem 11 from rotating while the element 13 turns. When the stem 11 has been completely depressed and is again released the tension of the spring 19 will tend to move the stem 11 upwards. As it does so the stem 11 will attempt to unwind the element 13 causing its outer surface to become enlarged and frictionally grip the sleeve 22.

Since the element 13 is contained within the sleeve 22 it is impossible for the element to be unwound very much and the friction between the parts (the element 13 and sleeve 22) will hold the element 13 fixed and as a result the helical lip 26 will cause the stem 11 to rotate. This rotation changes the rotative position of the chopper blade 12 with relation to the onion or material being chopped so that when the stem 11 is again depressed it will be in a different position and chop the onion at a different position. As the stem 11 is depressed a number of times and released the position of the blade 12 will change each time. When the stem has been depressed a sufficient number of times the onion or other material will be completely chopped.

According to the modification of the invention shown in Figs. 5–7 inclusive the body 70 comprises a hollow tubular glass member 70a and a cap 70b. The sides of the hollow tubular glass member are formed with an outwardly extending bead 71 which is adapted to be engaged by the bottom edge of a depending flange 70bb formed on the outer periphery of the cap 70b. A stem 72 rotatively extends through an opening 73 formed at the center of the cap 70b and at its bottom end is formed with a slot 74 into which the top edge of a chopper blade 75 extends. A rivet 76 extends through the end of the stem 72 and the chopper blade 75 for pivotally supporting this blade thereon so that it will be self-aligning with the surface against which it acts. The top edge of the chopper blade 75 is adapted to strike against a plate 77 attached to the underside of the cap 70b for limiting the outward movement of the stem 72. The chopper blade 75 is limited in pivoting on the rivet 76 by having a slot 75a with the sides thereof engageable against the sides of the stem 72. The stem 72 extends upward through a sleeve 78 mounted between the top face of the plate 70b and a U-shaped bracket 79. The bracket 79 has its ends 79a securely attached to the top face of the cap 70b by means of rivets 80. These rivets 80 also support the plate 77 upon the bottom face of the cap 70b. The intermediate portion 79b is formed with an opening 81 through which the stem 72 rotatively extends.

The upper end of the stem 72 is provided with a friction head 82 for engaging one's palm and which is securely attached thereto by means of a rivet 83. This rivet engages through an opening 84 formed in the friction head 82 in such a manner as to prevent any rotative motion of the friction head on the end of the stem 72. An expansion spring 85 acts between the intermediate portion 79b of the U-shaped bracket 79 and the bottom face of the friction head 82 for urging the stem 72 into its raised position.

The sides of the stem 72 are formed with flat helical shaped sides 86b and the sleeve 78 is formed with inwardly extending depressions 78a which are adapted to engage the flat helical sides 86b for controlling the rotation of the stem 72. A spring 86 is wound upon the outer periphery of the sleeve 78 and has one of its ends 86a extending away from the sleeve 78. The end 86a is securely attached to the top face of the cap 70b by means of a rivet 89.

When the stem 72 is urged downward against the action of the expansion spring 85 the friction between one's palm and the friction head 82 will act to retard the rotation of the stem 72. The flat helical sides 86b are formed on the stem in such a manner that they will rotate the sleeve 78 in a direction in which it will tend to unwind the spring 86. This unwinding action will loosen the holding action of the spring 86 and permit the sleeve 78 to rotate. But when the stem has been fully depressed and is again released the spring 85 will tend to urge the stem 72 back to its normal position, and while it is moving back to this position, the flat helical sides 86b will attempt to rotate the sleeve in the opposite direction and attempt to more tightly wind the spring 86. This latter action tends to increase the friction between the coils of the spring 86 and the sides of the sleeve 78 in a manner to limit the rotating of the sleeve 78. Since the friction head 82 has been released the stem 72 will be free to rotate, while the sleeve 78 remains stationary, and so move the chopper blade 75 to a different position with relation to the onion or material being chopped so that when the stem 72 is again depressed the chopper blade 75 will act upon a different portion of the onion.

The bottom end of the stem 72 is formed with beveled sides 72a and 72b which are adapted to enter into the cut formed by the blade 75 in the onion or other material for acting as a wedge to assist the blade in spreading the said material.

This construction which has been defined in detail is much more sanitary than that disclosed in Figs. 1 to 4 in that the cap of the body is formed with open sides to prevent water and waste materials from collecting therein. With this construction it is possible to wash and easily dry the food chopper after it has been used.

According to the modification shown in Figs. 8–10 inclusive a stem 30 is formed with flat helical sides 31. A cap 32 is fixedly attached to the top face of the plate 16 by means of rivets 33 and forms a space 34 adjacent the top wall of the plate 16. A disc 35 is mounted within the space 34 and has an opening 36 having flat sides 36a which are adapted to cooperate with the flat helical sides 31 of the stem 30. The outer edges of the disc 35 are cut away at points 37 as shown in Fig. 10. Balls 38 are mounted within the cutaway portions 37 in such a manner that when the stem 30 is depressed the disc 35 will be capable of rotating within the member 32 and roll the balls around the inner face thereof. But when the spring 19 urges the stem 30 back to its normal position after it has been released the disc 35 will tend to be rotated in the other direction and the balls 38 will be clamped between the narrow end of the cutaway portion 37 and the inner wall of the cap 32 for holding the disc 35 against rotating to cause the stem 30 to rotate and change the position of the chopper blade 12 with relation to the onion or material being chopped. The upper face of the cap element 32 is formed with a circular opening 39 through which the stem 30 extends and which permits the stem 30 to freely move therethrough without having any effect upon the rotation thereof.

According to the modification shown in Figs. 11–13 the disc 35' is mounted within an annular member 40 which has an open top 40'. This ring 40 is securely attached to the top face of the plate 16 by means of rivets 41. A means is provided for holding the disc 35' against rotating when the stem 30 is moved upwards, for rotating the stem. This means comprises upwardly extending leaf springs 42 stamped from the disc 35' and beneath which balls 43 are engaged.

When the stem 30 is depressed the disc 35' will rotate therewith and urge the balls 43 into a position shown in Fig. 13 so that they will have no effect thereon. But when the stem moves back to its normal position the balls 43 will be moved towards the shallow connected end of the springs 42 and tend to urge the disc 35' upwards. When this disc 35' is moved upwards its outer edge of the top face will frictionally bear against a portion of the annular ring 40 around the opening 40'. The friction between these parts will prevent the disc 35' from rotating, and so rotate the stem 30 to change the position of the chopper blade 12. In other respects this form of the invention is similar to that shown in Figs. 8–10.

According to the modification shown in Figs. 14 and 15, a stem 50 is formed with flat helical sides 51. The stem 50 extends through a round opening 52 formed in the top of the housing member. The housing member 53 is securely attached to the plate 16 by means of rivets 54. The portion of the stem 50 which is disposed within the housing 53 has a disc member 55 mounted thereon. The disc has an opening 55b formed with flat sides 55bb cooperating with the helical sides 51. This disc 55 is formed at its periphery with teeth 55a which are adapted to be engaged by a pawl 56. The pawl 56 extends through a slot 57 formed in the side wall of the housing 53 and has its extended end 56a pivotally supported upon a block 58 attached to the top face of the plate 16.

A leaf spring 59 is securely attached to the block 58 and engages a side wall of the pawl 56 for urging it into a position in which its inner end will engage the teeth 55a formed on the periphery of the disc 55. When the stem 50 is depressed the friction between the friction head and one's hand will prevent the stem from rotating and cause the disc 55 to rotate therewith with the pawl 56 idling over the teeth 55a. When the stem 50 has been completely depressed and is released the action of the expansion spring will cause the stem 50 to move upwards and the teeth 55a will engage the inner end of the pawl 56. This pawl will prevent the disc 55 from rotating. As a result the stem 50 will be rotated for changing the position of the chopper blade relative to the onion or other material being chopped.

According to the modification shown in Fig. 16, the top face of the plate 16 is formed with an upwardly extending portion 60 which has a flat top surface 61 against which a disc 62 is adapted to rest so that there is little friction between these parts. A stem 63 is slidably extended through the conical shaped cap 10b, and the disc 62 is formed with an opening 64 which has flat sides adapted to engage flat helical sides 65 formed on the stem 63. The outer periphery 62a of the disc 62 is adapted to frictionally bear against the inner surface of the conical shaped cap 10 so that there is a large amount of friction between these parts due to the great contact area for limiting this disc against rotating when the stem 63 moves upwards for causing the stem to rotate and change the position of the chopper blade 12 with relation to the onion or other material being chopped.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new and desire to secure by United States Letters Patent is:

1. In a device of the class described, a body for engaging over an onion or other material to be chopped, a stem vertically slidably mounted through said body, a chopper blade mounted on the bottom end of said stem to cut the onion when the stem is moved downwards, means for urging the stem into a raised position, an element encircling said stem and turnably supported on said body and adapted to resist turning in one direction, cooperative helix elements on said element and stem for causing said element to turn in the other direction when the stem is moved downwards, a friction head mounted on said stem to engage one's hand when the stem is depressed to hold the stem from turning and so cause said element to turn, whereby when the stem is released it will turn because said element now resists turning.

2. In a device of the class described, a body for engaging over an onion or other material to be chopped, a stem vertically slidably mounted through said body, a chopper blade mounted on the bottom end of said stem to cut the onion when the stem is moved downwards, means for urging the stem into a raised position, an element encircling said stem and turnably supported on said body and adapted to resist turning in one direction, cooperative helix elements on said element and stem for causing said element to turn in the other direction when the stem is moved downwards, a friction head mounted on said stem to engage one's hand when the stem is depressed to hold the stem from turning and so cause said element to turn, whereby when the stem is released it will turn because said element now resists turning, said body comprising a tubular element and a substantially conical shaped cap engaged upon the top end thereof, and said conical shaped cap being formed with a downwardly extending flange at its large end which is adapted to engage around the top end of said tubular element.

3. In a device of the class described, a body for engaging over an onion or other material to be chopped, a stem vertically slidably mounted through said body, a chopper blade mounted on the bottom end of said stem to cut the onion when the stem is moved downwards, means for urging the stem into a raised position, an element encircling said stem and turnably supported on said body and adapted to resist turning in one direction, cooperative helix elements on said element and stem for causing said element to turn in the other direction when the stem is moved downwards, a friction head mounted on said stem to engage one's hand when the stem is depressed to hold the stem from turning and so cause said element to turn, whereby when the stem is released it will turn because said element now resists turning, said body comprising a tubular element and a substantially conical shaped cap engaged upon the top end thereof, and said conical shaped cap being formed with a downwardly extending flange at its large end which is adapted to engage around the top end of said tubular element, said conical shaped cap having a plate attached across its large end.

4. In a device of the class described, a body for engaging over an onion or other material to be chopped, a stem vertically slidably mounted through said body, a chopper blade mounted on the bottom end of said stem to cut the onion when the stem is moved downwards, means for urging the stem into a raised position, an element encircling said stem and turnably supported on said body and adapted to resist turning in one direction, cooperative helix elements on said element and stem for causing said element to turn in the other direction when the stem is moved downwards, a friction head mounted on said stem to engage one's hand when the stem is depressed to hold the stem from turning and so cause said element to turn, whereby when the stem is released it will turn because said element now resists turning, said body comprising a tubular element and a substantially conical shaped cap engaged upon the top end thereof, and said conical shaped cap being formed with a downwardly extending flange at its large end which is adapted to engage around the top end of said tubular element, said conical shaped cap having a plate attached across its large end said conical shaped cap having its small end cut away and the edges thereof bent inwards forming an opening through which said stem passes, and said plate being formed with a centrally disposed opening immediately below the top opening in said conical shaped cap and through which the bottom end of said stem extends for slidably supporting said stem in said body.

5. In a device of the class described, a body for engaging over an onion or other material to be chopped, a stem vertically slidably mounted through said body, a chopper blade mounted on the bottom end of said stem to cut the onion when the stem is moved downwards, means for urging the stem into a raised position, an element encircling said stem and turnably supported on said body and adapted to resist turning in one direction, cooperative helix elements on said element and stem for causing said element to turn in the other direction when the stem is moved downwards, a friction head mounted on said stem to engage one's hand when the stem is depressed to hold the stem from turning and so cause said element to turn, whereby when the stem is released it will turn because said element now resists turning, the bottom end of said stem being formed with an inwardly extending slot and said chopper blade having its back edge extended into said slot, and a rivet extending through said chopper blade and the bottom end of said stem for pivotally supporting said chopper blade upon the bottom end of said stem so that it will be capable of aligning itself with the surface against which it operates.

6. In a device of the class described, a body for engaging over an onion or other material to be chopped, a stem vertically slidably mounted through said body, a chopper blade mounted on the bottom end of said stem to cut the onion when the stem is moved downwards, means for urging the stem into a raised position, an element encircling said stem and turnably supported on said body and adapted to resist turning in one direction, cooperative helix elements on said element and stem for causing said element to turn in the other direction when the stem is moved downwards, a friction head mounted on said stem to engage one's hand when the stem is depressed to hold the stem from turning and so cause said element to turn, whereby when the stem is released it will turn because said element now resists turning, said means for urging the stem into a raised position comprising an expansion spring operating between the top end of said body and the bottom face of said friction head.

7. In a device of the class described, a body for engaging over an onion or other material to be chopped, a stem vertically slidably mounted through said body, a chopper blade mounted on the bottom end of said stem to cut the onion when the stem is moved downwards, means for urging the stem into a raised position, an element encircling said stem and turnably supported on said body and adapted to resist turning in one direction, cooperative helix elements on said element and stem for causing said element to turn in the other direction when the stem is moved downwards, a friction head mounted on said stem to engage one's hand when the stem is depressed to hold the stem from turning and so cause said element to turn, whereby when the stem is released it will turn because said element now resists turning, said means for urging the stem into a raised position comprising an expansion spring operating between the top end of said body and the bottom face of said friction head, said friction head being formed with a downwardly extending tubular member which is adapted to encircle the topmost coils of said spring.

8. In a device of the class described, a body for engaging over an onion or other material to be chopped, a stem vertically slidably mounted through said body, a chopper blade mounted on the bottom end of said stem to cut the onion when the stem is moved downwards, means for urging the stem into a raised position, an element encircling said stem and turnably supported on said body and adapted to resist turning in one direction, cooperative helix elements on said element and stem for causing said element to turn in the other direction when the stem is moved downwards, a friction head mounted on said stem to engage one's hand when the stem is depressed to hold the stem from turning and so cause said element to turn, whereby when the stem is released it will turn because said element now resists turning, said element comprising a sleeve encircling said stem, a spring engaging around said sleeve and having one of its ends securely attached to a portion of said body so that when said stem is depressed said sleeve will be rotated so as to attempt unwinding said spring to permit said sleeve to rotate therewith, and when said stem moves upwards it will attempt rotating said sleeve to wind said spring up, increasing the friction between the coils of said spring and the adjacent face of said sleeve preventing said sleeve from rotating and so rotate said stem.

9. In a device of the class described, a body for engaging over an onion or other material to be chopped, a stem vertically slidably mounted through said body, a chopper blade mounted on the bottom end of said stem to cut the onion when the stem is moved downwards, means for urging the stem into a raised position, an element encircling said stem and turnably supported on said body and adapted to resist turning in one direction, cooperative helix elements on said element and stem for causing said element to turn in the other direction when the stem is moved downwards, a friction head mounted on said stem to engage one's hand when the stem is depressed to hold the stem from turning and so cause said element to turn, whereby when the stem is released it will turn because said element now resists turning, said element comprising a sleeve encircling said stem, a spring engaging around said sleeve and having one of its ends securely attached to a portion of said body so that when said stem is depressed said sleeve will be rotated so as to attempt unwinding said spring to permit said sleeve to rotate therein, and when said stem moves upwards it will attempt rotating said sleeve to wind said spring up, increasing the friction between the coils of said spring and the adjacent face of said sleeve preventing said sleeve from rotating and so rotate said stem, said cooperative helical elements comprising flat helical sides formed on said stem and complementary helical depressions formed in the sides of said sleeve and engaging against said flat helical sides.

10. In a device of the class described, a body for engaging over an onion or other material to be chopped, a stem vertically slidably mounted through said body, a chopper blade mounted on the bottom end of said stem to cut the onion when the stem is moved downwards, means for urging the stem into a raised position, an element encircling said stem and turnably supported on said body and adapted to resist turning in one direction, cooperative helix elements on said element and stem for causing said element to turn in the other direction when the stem is moved downwards, a friction head mounted on said stem to engage one's hand when the stem is depressed to hold the stem from turning and so cause said element to turn, whereby when the stem is released it will turn because said element now resists turning, said element for encircling said stem comprising a disc mounted within a cap securely attached to a portion of said body, portions of said disc being cut away, balls mounted within the cutaway portion of said disc so that when said stem is depressed said disc will rotate therewith and move said balls around within said cap, and when said stem is released and urged upwards said disc will be moved to clamp said balls between portions of said cap and the sides of said cutaway portions for holding said disc against rotating and so rotate said stem.

11. In a device of the class described, a body for engaging over an onion or other material to be chopped, a stem vertically slidably mounted through said body, a chopper blade mounted on the bottom end of said stem to cut the onion when the stem is moved downwards, means for urging the stem into a raised position, an element encircling said stem and turnably supported on said body and adapted to resist turning in one direction, cooperative helix elements on said element and stem for causing said element to turn in the other direction when the stem is moved downwards, a friction head mounted on said stem to engage one's hand when the stem is depressed to hold the stem from turning and so cause said element to turn, whereby when the stem is released it will turn because said element now resists turning, said element for encircling said stem comprising a disc mounted within a cap securely attached to a portion of said body, portions of said disc being cut away, balls mounted within the cutaway portion of said disc so that when said stem is depressed said disc will rotate therewith and move said balls around within said cap, and when said stem is released and urged upwards said disc will be moved to clamp said balls between portions of said cap and the sides of said cutaway portions for holding said disc against rotating and so rotate said stem, said cooperative helical elements comprising flat helical sides formed on said stem, said disc being formed with an opening through which said stem passes, and said opening having flat sides engageable against said first-mentioned flat sides.

12. In a device of the class described, a body for engaging over an onion or other material to be chopped, a stem vertically slidably mounted through said body, a chopper blade mounted on the bottom end of said stem to cut the onion when the stem is moved downwards, means for urging the stem into a raised position, an element encircling said stem and turnably supported on said body and adapted to resist turning in one direction, cooperative helix elements on said element and stem for causing said element to turn in the other direction when the stem is moved downwards, a fricton head mounted on said stem to engage one's hand when the stem is depressed to hold the stem from turning and so cause said element to turn, whereby when the stem is released it will turn because said element now resists turning, said element comprising a disc freely mounted on said stem and within a housing attached to a portion of said body, teeth formed on the periphery of said disc, a pawl pivotally mounted outside said housing and having a portion extending through a slot formed in the side of said housing for engaging said teeth, and a spring operating against said pawl for urging it in to a position in which it will engage said teeth for holding said disc against rotating to rotate said stem when said stem moves upwards.

CHARLES LUDWIG HANEL.